April 25, 1933.　　　　B. A. SMITH　　　　1,906,115

COMBINED RAIL BOND AND CLAMP

Filed Oct. 28, 1926

INVENTOR.
Benjamin A. Smith.
BY
Fay, Oberlin & Fay
ATTORNEYS.

Patented Apr. 25, 1933

1,906,115

UNITED STATES PATENT OFFICE

BENJAMIN A. SMITH, OF LAKEWOOD, OHIO, ASSIGNOR TO THE ELECTRIC RAILWAY IMPROVEMENT COMPANY, OF CLEVELAND, OHIO, A CORPORATION OF OHIO

COMBINED RAIL BOND AND CLAMP

Application filed October 28, 1926. Serial No. 144,687.

The present improvements relating, as indicated, to rail bonds have more particular regard to bonds of the arc weld or gas weld type and still more particularly to bonds of this type which are designed to be applied to the upper side of the rail base. The object of the invention is to so construct the bond terminal that it may be temporarily mechanically secured in place on the rail base and there held in place during the welding operation by which it is permanently attached.

To the accomplishment of the foregoing and related ends, the invention, then, consists of the means hereinafter fully described and particularly pointed out in the claim, the annexed drawing and the following description setting forth in detail certain mechanism embodying the invention, such disclosed means constituting, however, but one of various mechanical forms in which the prinicple of the invention may be used.

In said annexed drawing:—

Figure 1:
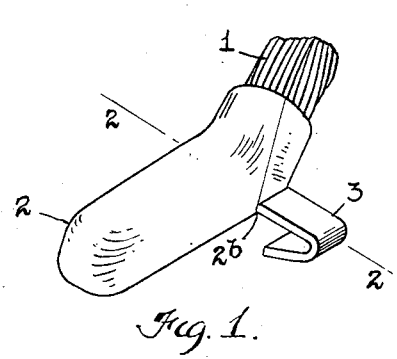
Figure 2:
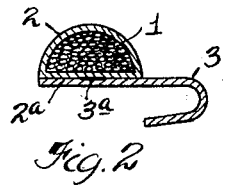
Figure 3:
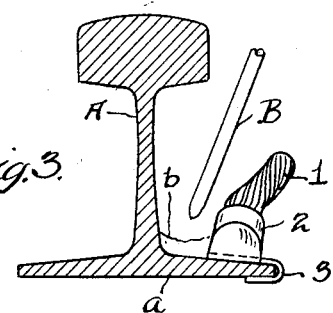
Figure 4:
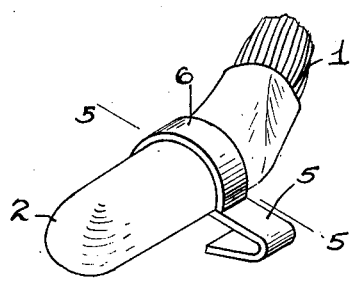
Figure 7:
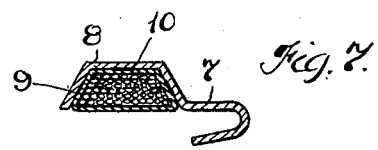
Figure 5:
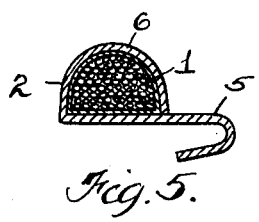
Figure 6:
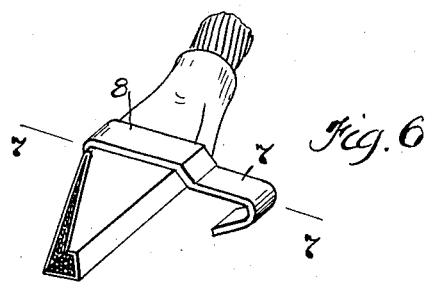

Fig. 1 is a broken perspective view of one end of a bond constructed in accordance with the present invention; Fig. 2 is a transverse section thereof taken on the plane indicated by the line 2—2, Fig. 1; Fig. 3 is a transverse section through a rail showing the bond in end elevation as applied thereto; Fig. 4 is a view similar to Fig. 1 but showing a modification in construction; Fig. 5 is a transverse section of the same, the plane of the section being indicated by the line 5—5, Fig. 4; Fig. 6 is a view similar to Fig. 1 but showing still another constructional form; and Fig. 7 is a transverse section of the latter, the plane of the section being indicated by the line 7—7, Fig. 6.

As is well understood, in bonds of the general type hereinbefore referred to, the body is usually of flexible stranded construction, e. g. twisted copper cable, the end of which is enclosed in a sleeve or sheath of steel or copper to constitute thereof the terminal whereby the bond is attached to the rail. Where the arc welding process is employed, the arc from an iron or copper pencil is caused to play upon the terminal and the adjacent surface of the rail with the result that molten metal from such pencil is deposited and interfused with the parts in question. Such pencil may itself constitute an electrode in the electric circuit or the arc may be struck between a carbon electrode and the parts in question and the end of a separate metallic pencil be introduced into the arc so as thus to be melted down. In applying a gas weld bond, substantially the same procedure is followed, except that the source of heat here is an oxy-acetylene flame or the like instead of an electric arc.

Where a bond of this type is to be applied to the rail base, the aforesaid sleeve or sheath that forms a part of the terminal is desirably made flat on its under side so as to be adapted to contact closely with the upper face of such rail base and the molten metal by which the terminal is welded to the rail is built up on the inner side of the terminal, i. e. between the latter and the rail. As above indicated, the present improvement consists in the provision on the terminal of means whereby the latter may be temporarily held in place during such welding operation. In the constructional form illustrated in Figs. 1, 2 and 3, the bond body 1 has a steel shell 2 fitted thereover, suitable brazing material being preferably interposed between the end of the body and the shell and the latter thereupon swaged or otherwise forcefully compressed around such end at a sufficiently high temperature to insure the thorough brazing together of these parts. The under side 2a of the terminal shell or sheath is left substantially flat, while the upper side is rounded in a more or less semi-circular form. Adjacent the inner end or heel of the terminal such under side of the shell is formed with a depression 2b in which is disposed one end of a clamp member 3 which consists of a small strap preferably of the same metal as the shell 2, and which projects outwardly from the latter and is then recurved downwardly and inwardly to present the hooklike form clearly shown in the figures just mentioned. This strip is spot welded to the shell as at the point 3a, or otherwise fixedly secured thereto.

In use the hooked portion of the clamp is fitted around the outer edge of the base a of the rail A, as shown in Fig. 3, being hammered or otherwise bent so as to more or less firmly retain the bond terminal in place. Thereupon molten metal b from an arc pencil B may be filled into the space between the terminal and the rail proper whereby the terminal is permanently attached and a good electrical connection at the same time secured.

In place of spot welding clamp 3 to the under side of the shell or sleeve 2, such clamp may of course be riveted thereto in the ordinary way as need not be described in detail.

In the modified constructional form shown in Figs. 4 and 5, the clamp member 5 consists, as before, of a metal strap having a hooked outer portion, but instead of spot welding or riveting the member to the bond terminal, the other end 6 of such strap is passed around the entire terminal at the sleeve or cable entrance end and is held to it by mechanical pressure only.

In Figs. 6 and 7 there is illustrated a method of affixing the clamp to an all copper bond terminal, the clamp 7 having its one end 8 fitted partly around the sleeve 9 which is here shown as of polygonal instead of rounded form above. In this case the clamp is secured to the terminal by means of an intermediate layer of solder 10.

In this last mentioned construction, it will be understood that the clamp will be made of steel as before and I have found that it is possible to attach the same by directly spot-welding as well as by soldering or brazing in the manner just set forth. The advantages accruing from use of the clamp are particularly evident in the case of such copper-terminal bond inasmuch as the steel clamp may be made stiff enough to insure firm mechanical attachment of the terminal to the rail and yet leave the copper of the bond proper exposed for union with the rail by the arc weld or equivalent process.

In each of the specific forms of the device thus shown and described, it will be seen that the clamp is directly attached to the bond terminal in such a way as to adapt it to hold the terminal in proper position on the rail for the welding operation. In no case is it necessary or desirable to weld the clamp itself to the rail nor is it considered that such clamp will have any bearing on the conductivity of the bond terminal after the welding operation. The form of the clamp is such as to avoid interference with or limit the extent of the weld without, however, detracting in any way from the security with which the bond terminal is mechanically held in place.

Other modes of applying the principle of my invention may be employed instead of the one explained, change being made as regards the mechanism herein disclosed, provided the means stated by the following claim or the equivalent of such stated means be employed.

I therefore particularly point out and distinctly claim as my invention:—

As a new article of manufacture, a rail bond having a flexible body portion and a terminal adapted to be attached to a rail or like object by depositing molten metal under high temperature conditions onto such terminal and the adjacent rail surface, said bond including a metal strap wrapped about said terminal and having a hook-like portion whereby the latter may be temporarily, mechanically secured in place.

Signed by me, this 20th day of October, 1926.

BENJAMIN A. SMITH.